United States Patent
Fujiwara

(10) Patent No.: US 10,640,625 B2
(45) Date of Patent: *May 5, 2020

(54) VINYL CHLORIDE RESIN COMPOSITION, VINYL CHLORIDE RESIN MOLDED PRODUCT, AND LAMINATE

(71) Applicant: ZEON CORPORATION, Chiyoda-ku, Tokyo (JP)

(72) Inventor: Takanori Fujiwara, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/119,538

(22) PCT Filed: Mar. 10, 2015

(86) PCT No.: PCT/JP2015/001304
§ 371 (c)(1),
(2) Date: Aug. 17, 2016

(87) PCT Pub. No.: WO2015/141181
PCT Pub. Date: Sep. 24, 2015

(65) Prior Publication Data
US 2017/0009055 A1  Jan. 12, 2017

(30) Foreign Application Priority Data

Mar. 19, 2014 (JP) .................. 2014-055862
Mar. 19, 2014 (JP) .................. 2014-055863

(51) Int. Cl.
| | | |
|---|---|---|
| C08K 5/11 | (2006.01) |
| B29C 41/18 | (2006.01) |
| B32B 27/30 | (2006.01) |
| C08L 27/06 | (2006.01) |
| B32B 27/06 | (2006.01) |
| B29C 41/00 | (2006.01) |
| B29C 44/12 | (2006.01) |
| B32B 5/18 | (2006.01) |
| B32B 27/08 | (2006.01) |
| B32B 27/40 | (2006.01) |
| C08G 18/32 | (2006.01) |
| C08G 18/63 | (2006.01) |
| C08G 18/65 | (2006.01) |
| C08G 18/76 | (2006.01) |
| C08J 5/18 | (2006.01) |
| C08J 9/36 | (2006.01) |
| C08K 5/12 | (2006.01) |
| C08K 5/1515 | (2006.01) |
| B29L 31/30 | (2006.01) |
| B29K 27/06 | (2006.01) |
| B29K 75/00 | (2006.01) |
| B29L 9/00 | (2006.01) |
| C08G 101/00 | (2006.01) |

(52) U.S. Cl.
CPC .............. *C08K 5/11* (2013.01); *B29C 41/003* (2013.01); *B29C 41/18* (2013.01); *B29C 44/12* (2013.01); *B32B 5/18* (2013.01); *B32B 27/065* (2013.01); *B32B 27/08* (2013.01); *B32B 27/304* (2013.01); *B32B 27/40* (2013.01); *C08G 18/3206* (2013.01); *C08G 18/3228* (2013.01); *C08G 18/632* (2013.01); *C08G 18/657* (2013.01); *C08G 18/7664* (2013.01); *C08J 5/18* (2013.01); *C08J 9/36* (2013.01); *C08K 5/12* (2013.01); *C08K 5/1515* (2013.01); *C08L 27/06* (2013.01); *B29K 2027/06* (2013.01); *B29K 2075/00* (2013.01); *B29L 2009/00* (2013.01); *B29L 2031/3008* (2013.01); *B32B 2266/0278* (2013.01); *B32B 2605/003* (2013.01); *C08G 2101/00* (2013.01); *C08G 2140/00* (2013.01); *C08J 2327/06* (2013.01); *C08L 2205/025* (2013.01)

(58) Field of Classification Search
CPC ................ B32B 27/304; B32B 27/065; B32B 2266/0278; B32B 2605/003
See application file for complete search history.

(56) References Cited

U.S. PATENT DOCUMENTS

| | | |
|---|---|---|
| 4,219,463 A | 8/1980 | Minagawa et al. |
| 4,330,452 A | 5/1982 | Cook |
| 4,361,473 A | 11/1982 | Young et al. |
| (Continued) | | |

FOREIGN PATENT DOCUMENTS

| | | |
|---|---|---|
| CN | 1745136 A | 3/2006 |
| CN | 101889054 A | 11/2010 |
| (Continued) | | |

OTHER PUBLICATIONS

Jun. 2, 2015, International Search Report issued in the International Patent Application No. PCT/JP2015/001304.

(Continued)

*Primary Examiner* — Hai Vo
(74) *Attorney, Agent, or Firm* — Kenja IP Law PC

(57) ABSTRACT

Provided is a vinyl chloride resin composition that can provide a molded product having superior flexibility at low temperatures. The vinyl chloride resin composition includes (a) a vinyl chloride resin and (b) a dodecanedioic acid diester. Moreover, (a) the vinyl chloride resin includes (x) a base vinyl chloride resin in an amount of from 70 mass % to 100 mass % and (y) vinyl chloride resin fine particles in an amount of from 0 mass % to 30 mass %.

7 Claims, No Drawings

(56) References Cited

U.S. PATENT DOCUMENTS

| | | | |
|---|---|---|---|
| 4,675,356 A | 6/1987 | Miyata | |
| 2006/0052517 A1 | 3/2006 | Mitsudera et al. | |
| 2010/0272984 A1 | 10/2010 | Hada et al. | |
| 2013/0089728 A1* | 4/2013 | Kobayashi | B32B 27/304 428/319.3 |
| 2016/0288463 A1* | 10/2016 | Fujiwara | C08K 5/10 |
| 2017/0008252 A1* | 1/2017 | Fujiwara | B32B 5/18 |

FOREIGN PATENT DOCUMENTS

| | | | | |
|---|---|---|---|---|
| EP | 0654500 A1 | | 5/1995 | |
| EP | 2248854 A1 | | 11/2010 | |
| GB | 715217 A | * | 9/1954 | ............... C08K 5/11 |
| JP | S5373241 A | | 6/1978 | |
| JP | S5883249 A | | 5/1983 | |
| JP | S61174270 A | | 8/1986 | |
| JP | H02138355 A | | 5/1990 | |
| JP | H02233744 A | | 9/1990 | |
| JP | H0426303 B2 | | 5/1992 | |
| JP | H0525342 A | | 2/1993 | |
| JP | H07188489 A | | 7/1995 | |
| JP | H0890697 A | | 4/1996 | |
| JP | 2007216506 A | | 8/2007 | |
| JP | 2011173974 A | | 9/2011 | |
| WO | 2009107463 A1 | | 9/2009 | |
| WO | WO-2012020618 A1 | * | 2/2012 | ........... B32B 27/304 |

OTHER PUBLICATIONS

Sep. 20, 2016, International Preliminary Report on Patentability issued in the International Patent Application No. PCT/JP2015/001304.

Dec. 11, 2018, Communication pursuant to Article 94(3) EPC issued by the European Patent Office in the corresponding European Patent Application No. 15764479.0.

Oct. 5, 2017, the Extended European Search Report issued by the European Patent Office in the corresponding European Patent Application No. 15764479.0.

\* cited by examiner

VINYL CHLORIDE RESIN COMPOSITION, VINYL CHLORIDE RESIN MOLDED PRODUCT, AND LAMINATE

TECHNICAL FIELD

The present disclosure relates to a vinyl chloride resin composition that can provide a powder molded product having superior flexibility at low temperatures, a vinyl chloride resin molded product formed through powder molding of the vinyl chloride resin composition, and a laminate including the vinyl chloride resin molded product and a foamed polyurethane molded product.

BACKGROUND

An automobile instrument panel has a structure in which a foamed polyurethane layer is disposed between a substrate and a surface skin formed from a vinyl chloride resin. Over time, the surface skin formed from the vinyl chloride resin discolors and experiences a reduction in heat aging resistance. One main cause of discoloration and so forth of the surface skin is a chemical reaction that occurs as a result of a tertiary amine used as a catalyst in formation of the foamed polyurethane layer migrating to the surface skin formed from the vinyl chloride resin. In order to prevent surface skin discoloring, a urethane integrated foamed molded product has been considered in which a granular catcher agent that captures volatile organic compounds produced in a foamed polyurethane layer and that is coated with an open cell foam sheet is provided near locations at which the edges of the foamed polyurethane layer are sealed by a surface skin and a substrate (for example, refer to PTL 1). However, there are sections where the surface skin and the foamed polyurethane layer are in contact in this urethane integrated foamed molded product and, as a result, surface skin discoloration due to the aforementioned chemical reaction cannot be prevented over a long period and heat aging resistance of the surface skin decreases.

On the other hand, a laminate has been considered in which a synthetic resin foamed layer is provided that joins a core material and a surface skin and in which the core material includes gas release holes for releasing gas produced in the foamed layer (for example, refer to PTL 2). However, the synthetic resin foamed layer and the surface skin are in contact in this laminate and, as a result, surface skin discoloration due to the aforementioned chemical reaction cannot be prevented over a long period and heat aging resistance of the surface skin decreases.

Furthermore, a molded product has been considered that includes a polyurethane molded product, a surface skin containing a vinyl chloride resin that covers at least one surface of the polyurethane molded product, and an amine catcher layer disposed between the polyurethane molded product and the surface skin (for example, refer to PTL 3). However, it is not possible to prevent migration of a tertiary amine to the surface skin formed from the vinyl chloride resin over a long period due to volatility of the amine catcher. Therefore, surface skin discoloration due to the aforementioned chemical reaction cannot be prevented over a long period and heat aging resistance of the surface skin decreases in this molded product.

On the other hand, a vinyl chloride resin composition for powder molding that includes a prescribed trimellitate plasticizer has been considered as a raw material for a surface skin of an automobile interior material (for example, refer to PTL 4). However, it is necessary to increase the blended amount of the plasticizer in order to improve heat aging resistance of a surface skin material that is obtained through powder molding of the vinyl chloride resin composition, which results in the surface skin material feeling sticky due to the plasticizer. A vinyl chloride resin composition for powder molding has also been considered that includes 100 parts by mass of vinyl chloride resin particles made from a vinyl chloride resin having an average degree of polymerization of at least 1,500 and 110 parts by mass to 150 parts by mass of a prescribed trimellitate plasticizer (for example, refer to PTL 5).

CITATION LIST

Patent Literature

PTL 1: JP 2007-216506 A
PTL 2: JP H8-90697 A
PTL 3: JP H4-26303 B
PTL 4: JP H2-138355 A
PTL 5: WO 2009/107463

SUMMARY

Technical Problem

In order that fragments of a surface skin of an automobile instrument panel that is laminated with a foamed polyurethane layer are not scattered when the surface skin breaks as designed at low temperatures upon expansion of an air bag, there has been demand in recent years for an automobile instrument panel including a surface skin having superior flexibility at low temperatures. However, is has not been possible to achieve an automobile instrument panel including a surface skin such as described above.

The present disclosure aims to solve a problem of provision of a vinyl chloride resin composition that can provide a molded product having superior flexibility at low temperatures. Another problem that the present disclosure aims to solve is provision of a vinyl chloride resin molded product that is formed through powder molding of the vinyl chloride resin composition described above and that has superior flexibility at low temperatures, and provision of a laminate including the vinyl chloride resin molded product and a foamed polyurethane molded product.

Solution to Problem

As a result of conducting diligent investigation in order to solve the problems described above, the present inventor discovered that a vinyl chloride resin composition including (a) a vinyl chloride resin and (b) a dodecanedioic acid diester can provide a molded product having particularly superior flexibility at low temperatures. This discovery led to the present disclosure.

A presently disclosed vinyl chloride resin composition includes (a) a vinyl chloride resin and (b) a dodecanedioic acid diester, wherein (a) the vinyl chloride resin includes (x) a base vinyl chloride resin in an amount of from 70 mass % to 100 mass % and (y) vinyl chloride resin fine particles in an amount of from 0 mass % to 30 mass %.

The presently disclosed vinyl chloride resin composition preferably includes from 5 parts by mass to 200 parts by mass of (b) the dodecanedioic acid diester relative to 100 parts by mass of (a) the vinyl chloride resin.

The presently disclosed vinyl chloride resin composition may further include (c) a trimellitic acid ester.

The presently disclosed vinyl chloride resin composition preferably includes a total amount of from 5 parts by mass to 200 parts by mass of (b) the dodecanedioic acid diester and (c) the trimellitic acid ester relative to 100 parts by mass of (a) the vinyl chloride resin.

The presently disclosed vinyl chloride resin composition preferably has a blending ratio of (b) the dodecanedioic acid diester relative to (c) the trimellitic acid ester (dodecanedioic acid diester/trimellitic acid ester), expressed as a mass ratio, of from 1/99 to 99/1.

In the presently disclosed vinyl chloride resin composition, (x) the base vinyl chloride resin is preferably vinyl chloride resin particles.

The presently disclosed vinyl chloride resin composition is preferably used for powder molding and is more preferably used for powder slush molding.

A presently disclosed vinyl chloride resin molded product is obtainable through powder molding of the vinyl chloride resin composition described above.

The vinyl chloride resin molded product is preferably used as a surface skin of an automobile instrument panel.

A presently disclosed laminate includes a foamed polyurethane molded product and the vinyl chloride resin molded product described above. The laminate is preferably used as a laminate of an automobile instrument panel.

Advantageous Effect

The presently disclosed vinyl chloride resin composition can provide a molded product having superior flexibility at low temperatures.

DETAILED DESCRIPTION (Vinyl Chloride Resin Composition)

A presently disclosed vinyl chloride resin composition includes (a) a vinyl chloride resin and (b) a dodecanedioic acid diester, and may optionally further include (c) a trimellitic acid ester, additives, and so forth.

<Vinyl Chloride Resin>

Examples of (a) the vinyl chloride resin include homopolymers of vinyl chloride and copolymers preferably including at least 50 mass % of vinyl chloride units and more preferably at least 70 mass % of vinyl chloride units. Specific examples of comonomers of vinyl chloride copolymers include: olefins such as ethylene and propylene; halogenated olefins such as allyl chloride, vinylidene chloride, vinyl fluoride, and trifluorochloroethylene; carboxylic acid vinyl esters such as vinyl acetate and vinyl propionate; vinyl ethers such as isobutyl vinyl ether and cetyl vinyl ether; allyl ethers such as allyl-3-chloro-2-oxy propyl ether and allyl glycidyl ether; unsaturated carboxylic acids, esters of unsaturated carboxylic acids, and acid anhydrides of unsaturated carboxylic acids such as acrylic acid, maleic acid, itaconic acid, acrylic acid-2-hydroxyethyl, methyl methacrylate, monomethyl maleate, diethyl maleate, and maleic anhydride; unsaturated nitriles such as acrylonitrile and methacrylonitrile; acrylamides such as acrylamide, N-methylolacrylamide, acrylamido-2-methylpropane sulfonic acid, and (meth)acrylamidopropyltrimethylammonium chloride; and allyl amines and derivatives thereof such as allylamine benzoate and diallyldimethylammonium chloride. The above examples of monomers are merely some of the monomers (comonomers) that are copolymerizable with vinyl chloride. Further examples of various types of monomers that can be used as comonomers are provided in pages 75-104 of "Polyvinyl chloride" edited by the Vinyl Section of the Kinki Chemical Society Japan and published by Nikkan Kogyo Shimbun, Ltd. (1988). Any one of these monomers or any two or more of these monomers may be used. Moreover, (a) the vinyl chloride resin may include a resin formed by graft polymerization of (1) vinyl chloride or (2) vinyl chloride and a copolymerizable comonomer such as described above with a resin such as an ethylene-vinyl acetate copolymer, an ethylene-methyl methacrylate copolymer, an ethylene-ethyl acrylate copolymer, or a chlorinated polyethylene.

The present description uses the term "(meth)acryl" to refer to either or both of acryl and methacryl.

Conventionally known production methods such as suspension polymerization, emulsion polymerization, solution polymerization, and bulk polymerization can be used to produce (a) the vinyl chloride resin.

Furthermore, (a) the vinyl chloride resin may be a single type of vinyl chloride resin or a mixture of two or more types of vinyl chloride resins. Specifically, (a) the vinyl chloride resin may be (x) a base vinyl chloride resin only or may be a mixture of (x) a base vinyl chloride resin and (y) vinyl chloride resin fine particles. It is preferable that (a) the vinyl chloride resin includes (x) a base vinyl chloride resin in an amount of from 70 mass % to 100 mass % and (y) vinyl chloride resin fine particles in an amount of from 0 mass % to 30 mass %.

In the vinyl chloride resin composition, (x) the base vinyl chloride resin included in (a) the vinyl chloride resin functions as a matrix resin. Moreover, (y) the vinyl chloride resin fine particles, which are optionally included in (a) the vinyl chloride resin as desired, function as a dusting agent (powder fluidity modifier) described further below. It is preferable that (x) the base vinyl chloride resin is produced by suspension polymerization and (y) the vinyl chloride resin fine particles are produced by emulsion polymerization.

[Base Vinyl Chloride Resin]

The average degree of polymerization of (x) the base vinyl chloride resin is preferably at least 800 and no greater than 5,000, and more preferably at least 800 and no greater than 3,000. As a result of the average degree of polymerization of (x) the base vinyl chloride resin being in the range described above, favorable fluidity and meltability of the vinyl chloride resin composition during powder molding can be obtained and a vinyl chloride resin molded product formed through powder molding of the vinyl chloride resin composition can be provided with favorable heat aging resistance. Note that the average degree of polymerization is measured in accordance with JIS K6720-2.

Vinyl chloride resin particles are preferably used as (x) the base vinyl chloride resin. No specific limitations are placed on the average particle diameter of the vinyl chloride resin particles used as (x) the base vinyl chloride resin. The average particle diameter is preferably at least 50 µm and no greater than 500 µm, more preferably at least 50 µm and no greater than 250 µm, and particularly preferably at least 100 µm and no greater than 200 µm. As a result of the average particle diameter of the vinyl chloride resin particles used as (x) the base vinyl chloride resin being in the range described above, powder fluidity of the vinyl chloride resin composition and smoothness of a vinyl chloride resin molded product formed through powder molding of the vinyl chloride resin composition are improved. The average particle diameter is measured in accordance with a sieving method using a JIS standard sieve prescribed by JIS Z8801.

The amount of (x) the base vinyl chloride resin in 100 mass % of (a) the vinyl chloride resin is normally at least 70 mass % and no greater than 100 mass %, preferably at least 70 mass % and no greater than 99 mass %, more preferably at least 75 mass % and no greater than 95 mass %, and particularly preferably at least 80 mass % and no greater than 92 mass %.

[Vinyl Chloride Resin Fine Particles]

The average particle diameter of (y) the vinyl chloride resin fine particles is preferably at least 0.1 μm and no greater than 10 μm. The stated average particle diameter improves powder fluidity of the vinyl chloride resin composition. The average particle diameter of (y) the vinyl chloride resin fine particles is measured by a laser diffraction method in accordance with JIS Z8825 using, for example, a SALD-2300 produced by Shimadzu Corporation.

The average degree of polymerization of a vinyl chloride resin forming (y) the vinyl chloride resin fine particles is preferably at least 500 and no greater than 2,000, and more preferably at least 700 and no greater than 1,500.

Moreover, the amount of (y) the vinyl chloride resin fine particles in 100 mass % of (a) the vinyl chloride resin is normally at least 0 mass % and no greater than 30 mass %, preferably at least 1 mass % and no greater than 30 mass %, more preferably at least 5 mass % and no greater than 25 mass %, and particularly preferably at least 8 mass % and no greater than 20 mass %.

<Dodecanedioic Acid Diester>

Herein, (b) the dodecanedioic acid diester included in the vinyl chloride resin composition is a diester obtained through esterification of an alcohol and dodecanedioic acid, or an alkylated product of dodecanedioic acid, and functions as a plasticizer. The alcohol esterified with dodecanedioic acid may be an aliphatic alcohol, an alicyclic alcohol, or an aromatic alcohol. The alcohol is preferably an aliphatic alcohol. The alcohol may be a single type of alcohol or a mixture of two or more types of alcohols. The alcohol preferably has a carbon number of at least 8 and no greater than 12.

Specific examples of the dodecanedioic acid diester used herein include dimethyl dodecanedioate, diethyl dodecanedioate, dipropyl dodecanedioate, diisopropyl dodecanedioate, dibutyl dodecanedioate, diisobutyl dodecanedioate, dipentyl dodecanedioate, diisopentyl dodecanedioate, dihexyl dodecanedioate, diisohexyl dodecanedioate, diheptyl dodecanedioate, diisoheptyl dodecanedioate, di-n-octyl dodecanedioate, diisooctyl dodecanedioate, bis(2-ethylhexyl) dodecanedioate, n-octyl(2-ethylhexyl) dodecanedioate, di-n-nonyl dodecanedioate, diisononyl dodecanedioate, n-nonyl(isononyl) dodecanedioate, di-n-decyl dodecanedioate, diisodecyl dodecanedioate, n-decyl(isodecyl) dodecanedioate, n-octyl(n-decyl) dodecanedioate, n-decyl(2-ethylhexyl) dodecanedioate, di-n-undecyl dodecanedioate, diisoundecyl dodecanedioate, n-undecyl(isoundecyl) dodecanedioate, di-n-dodecyl dodecanedioate, diisododecyl dodecanedioate, n-dodecyl(isododecyl) dodecanedioate, n-octyl(n-dodecyl) dodecanedioate, n-dodecyl(2-ethylhexyl) dodecanedioate, n-decyl(n-dodecyl) dodecanedioate, bis(2-ethylhexyl) α-methyldodecanedioate, bis(2-ethylhexyl) α-ethyldodecanedioate, bis(2-ethylhexyl) α-isopropyldodecanedioate, bis(2-ethylhexyl) β-methyldodecanedioate, bis(2-ethylhexyl) β-ethyldodecanedioate, bis(2-ethylhexyl) β-isopropyldodecanedioate, bis(2-ethylhexyl) γ-methyldodecanedioate, bis(2-ethylhexyl) γ-ethyldodecanedioate, bis(2-ethylhexyl) γ-isopropyldodecanedioate, bis(2-ethylhexyl) α,β-dimethyldodecanedioate, bis(2-ethylhexyl) α,β-diethyldodecanedioate, and bis(2-ethylhexyl) α,β-diisopropyldodecanedioate. It is preferable that (b) the dodecanedioic acid diester is a dodecanedioic acid diester of dodecanedioic acid and an aliphatic alcohol having a carbon number of 8-12, more preferable that (b) the dodecanedioic acid diester is a dodecanedioic acid diester of dodecanedioic acid and an aliphatic alcohol having a carbon number of 8-10, further preferable that (b) the dodecanedioic acid diester is a dodecanedioic acid diester of dodecanedioic acid and an aliphatic alcohol having a carbon number of 8, and particularly preferably that (b) the dodecanedioic acid diester is bis(2-ethylhexyl) dodecanedioate. Note that (b) the dodecanedioic acid diester may be a single type of dodecanedioic acid diester or may be a mixture of two or more types of dodecanedioic acid di esters.

As a result of (b) the dodecanedioic acid diester being in the scope described above, a vinyl chloride resin molded product obtained through powder molding of the presently disclosed vinyl chloride resin composition has superior flexibility at low temperatures and tensile characteristics.

In a situation in which (c) a trimellitic acid ester is not included, the amount of (b) the dodecanedioic acid diester relative to 100 parts by mass of (a) the vinyl chloride resin is preferably at least 5 parts by mass and no greater than 200 parts by mass, more preferably at least 30 parts by mass and no greater than 180 parts by mass, and particularly preferably at least 50 parts by mass and no greater than 150 parts by mass. As a result of the amount of (b) the dodecanedioic acid diester being in the range described above, a vinyl chloride resin molded product formed through powder molding of the vinyl chloride resin composition can be provided with favorable flexibility at low temperatures.

<Trimellitic Acid Ester>

The presently disclosed vinyl chloride resin composition may further include (c) a trimellitic acid ester as a plasticizer. Inclusion of (c) the trimellitic acid ester in the vinyl chloride resin composition improves the balance of fogging characteristics and flexibility of a vinyl chloride resin molded product obtained through powder molding of the vinyl chloride resin composition.

It is preferable that (c) the trimellitic acid ester is an ester compound of trimellitic acid and a monohydric alcohol.

Specific examples of (c) the trimellitic acid ester include tri-n-hexyl trimellitate, tri-n-heptyl trimellitate, tri-n-octyl trimellitate, tri(2-ethylhexyl) trimellitate, tri-n-nonyl trimellitate, tri-n-decyl trimellitate, triisodecyl trimellitate, tri-n-undecyl trimellitate, tri-n-dodecyl trimellitate, and tri-n-alkyl trimellitates (esters including two or more types of alkyl groups having differing carbon numbers of from 6 to 12 in molecules thereof).

One specific preferable example of (c) the trimellitic acid ester is a compound represented by formula (1) shown below.

[CHEM. 1]

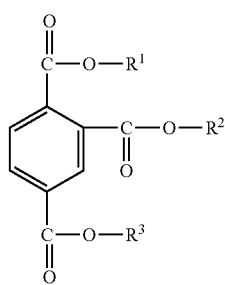

(1)

In formula (1), $R^1$, $R^2$, and $R^3$ are alkyl groups that may be the same or different.

A straight chain ratio of each of $R^1$, $R^2$, and $R^3$ is preferably at least 90 mol % and more preferably at least 95 mol %. The proportion of alkyl groups having a carbon number of no greater than 7 relative to all alkyl groups $R^1$, $R^2$, and $R^3$ is preferably at least 0 mol % and no greater than 10 mol %. The proportion of alkyl groups having a carbon number of 8 and 9 relative to all alkyl groups $R^1$, $R^2$, and $R^3$ is preferably at least 5 mol % and no greater than 100 mol %, more preferably at least 40 mol % and no greater than 95 mol %, and particularly preferably at least 75 mol % and no greater than 95 mol %. The proportion of alkyl groups having a carbon number of 10 relative to all alkyl groups $R^1$, $R^2$, and $R^3$ is preferably at least 0 mol % and no greater than 95 mol %, more preferably at least 5 mol % and no greater than 60 mol %, and particularly preferably at least 5 mol % and no greater than 25 mol %. The proportion of alkyl groups having a carbon number of at least 11 relative to all alkyl groups $R^1$, $R^2$, and $R^3$ is preferably at least 0 mol % and no greater than 10 mol %. Note that the straight chain ratios of $R^1$, $R^2$, and $R^3$ are the proportions of straight chain alkyl groups relative to all alkyl groups for $R^1$, $R^2$, and $R^3$ respectively.

Specific examples of straight chain alkyl groups that can form $R^1$, $R^2$, and $R^3$ in formula (1) include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-pentadecyl group, an n-hexadecyl group, an n-heptadecyl group, and an n-stearyl group. Specific examples of branched alkyl groups that can form $R^1$, $R^2$, and $R^3$ in formula (1) include an i-propyl group, an i-butyl group, an i-pentyl group, an i-hexyl group, an i-heptyl group, an i-octyl group, an i-nonyl group, an i-decyl group, an i-undecyl group, an i-dodecyl group, an i-tridecyl group, an i-pentadecyl group, an i-hexadecyl group, an i-heptadecyl group, an i-octadecyl group, a t-butyl group, a t-pentyl group, a t-hexyl group, a t-heptyl group, a t-octyl group, a t-nonyl group, a t-decyl group, a t-undecyl group, a t-dodecyl group, a t-tridecyl group, a t-pentadecyl group, a t-hexadecyl group, a t-heptadecyl group, a t-octadecyl group, and a 2-ethylhexyl group.

Note that (c) the trimellitic acid ester may be a single compound or may be a mixture.

The total amount of the (b) the dodecanedioic acid diester and (c) the trimellitic acid ester relative to 100 parts by mass of (a) the vinyl chloride resin is preferably at least 5 parts by mass and no greater than 200 parts by mass, more preferably at least 30 parts by mass and no greater than 180 parts by mass, and particularly preferably at least 50 parts by mass and no greater than 150 parts by mass. As a result of the total amount of (b) the dodecanedioic acid diester and (c) the trimellitic acid ester being in the range described above, a vinyl chloride resin molded product formed through powder molding of the vinyl chloride resin composition can be provided with favorable flexibility at low temperatures.

From a viewpoint of providing favorable fogging characteristics to the vinyl chloride resin molded product formed through powder molding of the vinyl chloride resin composition, a blending ratio of (b) the dodecanedioic acid diester relative to (c) the trimellitic acid ester (dodecanedioic acid diester/trimellitic acid ester), expressed as a mass ratio, is preferably no greater than 99/1, more preferably no greater than 50/50, further preferably no greater than 35/65, and particularly preferably no greater than 20/80. Furthermore, from a viewpoint of providing a favorable balance of high levels of flexibility at low temperatures and fogging characteristics to the vinyl chloride resin molded product formed through powder molding of the vinyl chloride resin composition, the blending ratio of (b) the dodecanedioic acid diester relative to (c) the trimellitic acid ester (dodecanedioic acid diester/trimellitic acid ester), expressed as a mass ratio, is preferably at least 1/99, more preferably at least 5/99, and particularly preferably at least 15/99.

<Additives>

Besides (a) the vinyl chloride resin, (b) the dodecanedioic acid diester, and (c) the trimellitic acid ester, the presently disclosed vinyl chloride resin composition may include various additives. Although no specific limitations are placed on these additives, examples of additives that may be used include plasticizers other than (b) the dodecanedioic acid diester and (c) the trimellitic acid ester (hereinafter also referred to as "other plasticizers"), perchloric acid-treated hydrotalcite, zeolites, fatty acid metal salts, dusting agents (powder fluidity modifiers) other than (y) the vinyl chloride resin fine particles (hereinafter also referred to as "other dusting agents"), and other additives.

[Other Plasticizers]

Specific examples of other plasticizers besides (b) the dodecanedioic acid diester and (c) the trimellitic acid ester that may be included in the presently disclosed vinyl chloride resin composition include primary plasticizers and secondary plasticizers listed below.

Examples of so-called primary plasticizers include:

pyromellitic acid esters such as tetra-n-hexyl pyromellitate, tetra-n-heptyl pyromellitate, tetra-n-octyl pyromellitate, tetra(2-ethylhexyl) pyromellitate, tetra-n-nonyl pyromellitate, tetra-n-decyl pyromellitate, tetraisodecyl pyromellitate, tetra-n-undecyl pyromellitate, tetra-n-dodecyl pyromellitate, and tetra-n-alkyl pyromellitates (esters including two or more types of alkyl groups having differing carbon numbers of from 6 to 12 in molecules thereof);

epoxidized vegetable oils such as epoxidized soybean oil and epoxidized linseed oil;

phthalic acid derivatives such as dimethyl phthalate, diethyl phthalate, di-n-butyl phthalate, diisobutyl phthalate, di-n-heptyl phthalate, di(2-ethylhexyl) phthalate, di-n-octyl phthalate, di-n-nonyl phthalate, di-n-decyl phthalate, diisodecyl phthalate, di-n-undecyl phthalate, di-n-dodecyl phthalate, di-n-tridecyl phthalate, dicyclohexyl phthalate, diphenyl phthalate, dibenzyl phthalate, and n-butylbenzyl phthalate;

isophthalic acid derivatives such as dimethyl isophthalate, di(2-ethylhexyl) isophthalate, and diisooctyl isophthalate;

tetrahydrophthalic acid derivatives such as di(2-ethylhexyl) tetrahydrophthalate, di-n-octyl tetrahydrophthalate, and diisodecyl tetrahydrophthalate;

adipic acid derivatives such as di-n-butyl adipate, di(2-ethylhexyl) adipate, diisononyl adipate, and diisodecyl adipate;

maleic acid derivatives such as dimethyl maleate, diethyl maleate, di-n-butyl maleate, and di(2-ethylhexyl) maleate;

fumaric acid derivatives such as di-n-butyl fumarate and di(2-ethylhexyl) fumarate;

citric acid derivatives such as triethyl citrate, tri-n-butyl citrate, acetyltriethyl citrate, and acetyltri(2-ethylhexyl) citrate;

itaconic acid derivatives such as monomethyl itaconate, mono-n-butyl itaconate, dimethyl itaconate, diethyl itaconate, di-n-butyl itaconate, and di(2-ethylhexyl) itaconate;

ricinoleic acid derivatives such as methylacetyl ricinoleate, n-butylacetyl ricinoleate, glyceryl monoricinoleate, and diethylene glycol monoricinoleate;

stearic acid derivatives such as n-butyl stearate and diethylene glycol distearate;

phosphoric acid derivatives such as triethyl phosphate, tri-n-butyl phosphate, tri(2-ethylhexyl) phosphate, tri-n-butoxyethyl phosphate, triphenyl phosphate, cresyl diphenyl phosphate, tricresyl phosphate, trixylenyl phosphate, and tris(chloroethyl) phosphate;

glycerin derivatives such as glycerol monoacetate, glycerol triacetate, and glycerol tributyrate;

epoxy derivatives such as epoxy hexahydro diisodecyl phthalate, epoxy triglyceride, epoxidized octyl oleate, and epoxidized decyl oleate; and polyesters such as adipic acid polyesters, sebacic acid polyesters, and phthalic acid polyesters.

Examples of so-called secondary plasticizers include chlorinated paraffin, fatty acid esters of glycol such as triethylene glycol dicaprylate, n-butyl epoxy stearate, phenyl oleate, and methyl dihydroabietate.

Any one or any two or more of these other plasticizers may be used in the presently disclosed vinyl chloride resin composition. In a situation in which a secondary plasticizer is used, a primary plasticizer of equivalent or greater mass is preferably used in combination with the secondary plasticizer.

Among the other plasticizers listed above, pyromellitic acid esters and epoxidized plant oils are preferable, epoxidized plant oils are more preferable, and epoxidized soybean oil is particularly preferable.

The amount of the other plasticizers described above relative to 100 parts by mass of (a) the vinyl chloride resin is preferably at least 0.1 parts by mass and no greater than 30 parts by mass, more preferably at least 0.5 parts by mass and no greater than 20 parts by mass, and particularly preferably at least 1 part by mass and no greater than 10 parts by mass. As a result of the amount of plasticizers other than (b) the dodecanedioic acid diester and (c) the trimellitic acid ester being in the range described above, a vinyl chloride resin molded product formed through powder molding of the vinyl chloride resin composition can be provided with favorable flexibility at low temperatures.

[Perchloric Acid-Treated Hydrotalcite]

The perchloric acid-treated hydrotalcite that may be included in the presently disclosed vinyl chloride resin composition can be easily produced by, for example, addition and stirring of hydrotalcite with a dilute aqueous solution of perchloric acid, followed by filtration, dehydration, and drying as required. Through this process, at least some of the carbonate anions ($CO_3^{2-}$) in the hydrotalcite are substituted with perchlorate anions ($ClO_4^-$) (note that 2 mol of perchlorate anions are substituted per 1 mol of carbonate anions). The molar ratio of hydrotalcite and perchloric acid may be freely set, although a ratio of from 0.1 mol to 2 mol of perchloric acid relative to 1 mol of hydrotalcite is typical.

The substitution ratio of carbonate anions in the untreated (unsubstituted) hydrotalcite by perchlorate anions is preferably at least 50 mol %, more preferably at least 70 mol %, and particularly preferably at least 85 mol %. Moreover, the substitution ratio of carbonate anions in the untreated (unsubstituted) hydrotalcite by perchlorate anions is preferably no greater than 95 mol %. As a result of the substitution ratio of carbonate anions in the untreated (unsubstituted) hydrotalcite by perchlorate anions being in the range described above, a vinyl chloride resin molded product formed through powder molding of the vinyl chloride resin composition can be provided with favorable flexibility at low temperatures.

Hydrotalcite is a non-stoichiometric compound represented by a general formula: $[Mg_{1-x}Al_x(OH)_2]^{x+}[(CO_3)_{x/2}.mH_2O]^{x-}$, and is an inorganic substance having a layered crystal structure formed by a positively charged basic layer of $[Mg_{1-x}Al_x(OH)_2]^{x+}$ and a negatively charged intermediate layer of $[(CO_3)_{x/2}.mH_2O]^{x+}$. In the general formula shown above, x represents a number that is greater than 0 and no greater than 0.33. Natural hydrotalcite is represented by $Mg_6Al_2(OH)_{16}CO_3.4H_2O$. On the other hand, a synthetic hydrotalcite represented by $Mg_{4.5}Al_2(OH)_{13}CO_3.3.5H_2O$ is commercially available. Synthetic hydrotalcite can for example be synthesized by a method described in JP S61-174270 A.

The amount of the perchloric acid-treated hydrotalcite relative to 100 parts by mass of (a) the vinyl chloride resin is preferably at least 0.5 parts by mass and no greater than 7 parts by mass, more preferably at least 1 part by mass and no greater than 6 parts by mass, and particularly preferably at least 1.5 parts by mass and no greater than 5.5 parts by mass. As a result of the amount of the perchloric acid-treated hydrotalcite being in the range described above, a vinyl chloride resin molded product formed through powder molding of the vinyl chloride resin composition can be provided with favorable flexibility at low temperatures.

[Zeolite]

The presently disclosed vinyl chloride resin composition may include a zeolite as a stabilizer. A zeolite is a compound represented by a general formula: $M_{x/n}.[(AlO_2)_x.(SiO_2)_y].zH_2O$ (in the general formula, M is a metal ion of valency n, x+y is the number of tetrahedra per unit cell, and z is the number of moles of water). Examples of M in the general formula include monovalent and divalent metals such as Na, Li, Ca, Mg, and Zn, and mixtures thereof.

No specific limitations are placed on the amount of the zeolite that is included. However, the amount of the zeolite relative to 100 parts by mass of (a) the vinyl chloride resin is preferably at least 0.1 parts by mass and no greater than 5 parts by mass.

[Fatty Acid Metal Salt]

The fatty acid metal salt that may be included in the presently disclosed vinyl chloride resin composition is preferably a metal salt of a monobasic fatty acid, more preferably a metal salt of a monobasic fatty acid having a carbon number of 12-24, and particularly preferably a metal salt of a monobasic fatty acid having a carbon number of 15-21. Specific examples of the fatty acid metal salt include lithium stearate, magnesium stearate, aluminum stearate, calcium stearate, strontium stearate, barium stearate, zinc stearate, calcium laurate, barium laurate, zinc laurate, barium 2-ethylhexanoate, zinc 2-ethylhexanoate, barium ricinoleate, and zinc ricinoleate. The metal in the fatty acid metal salt is preferably a metal that can produce polyvalent cations, more preferably a metal that can produce divalent cations, further preferably a metal from periods 3-6 of the periodic table that can produce divalent cations, and particularly preferably a metal from period 4 of the periodic table that can produce divalent cations. The fatty acid metal salt is most preferably zinc stearate.

The amount of the fatty acid metal salt relative to 100 parts by mass of (a) the vinyl chloride resin is preferably at least 0.05 parts by mass and no greater than 5 parts by mass, more preferably at least 0.1 parts by mass and no greater than 1 part by mass, and particularly preferably at least 0.1 parts by mass and no greater than 0.5 parts by mass. As a result of the amount of the fatty acid metal salt being in the range described above, a vinyl chloride resin molded product formed through powder molding of the vinyl chloride resin composition can be provided with favorable flexibility at low temperatures and a color difference value thereof can be reduced.

[Other Dusting Agents]

Examples of other dusting agents (powder fluidity modifiers) besides (y) the vinyl chloride resin fine particles that may be included in the presently disclosed vinyl chloride resin composition include: inorganic fine particles such as calcium carbonate, talc, and aluminum oxide; and organic fine particles such as polyacrylonitrile resin fine particles, poly(meth)acrylate resin fine particles, polystyrene resin fine particles, polyethylene resin fine particles, polypropylene resin fine particles, polyester resin fine particles, and polyamide resin fine particles. Among these examples, inorganic fine particles having an average particle diameter of at least 10 nm and no greater than 100 nm are preferable. No specific limitations are placed on the amount of the dusting agent that is included. In the case of a dusting agent that is not (y) the vinyl chloride resin fine particles, the amount of the dusting agent relative to 100 parts by mass of (a) the vinyl chloride resin is preferably no greater than 30 parts by mass and more preferably at least 5 parts by mass and no greater than 25 parts by mass.

[Other Additives]

Examples of other additives that may be included in the presently disclosed vinyl chloride resin composition include colorants, impact modifiers, perchloric acid compounds other than perchloric acid-treated hydrotalcite (for example, sodium perchlorate and potassium perchlorate), antioxidants, fungicides, flame retardants, antistatic agents, fillers, light stabilizers, foaming agents, and β-diketones.

Specific examples of colorants include quinacridone pigments, perylene pigments, condensed polyazo pigments, isoindolinone pigments, copper phthalocyanine pigments, titanium white, and carbon black. Any one of these pigments or any two or more of these pigments may be used.

A quinacridone pigment is obtained through concentrated sulfuric acid treatment of a p-phenylene dianthranilic acid and has a hue from yellowish red to reddish purple. Specific examples of quinacridone pigments include quinacridone red, quinacridone magenta, and quinacridone violet.

A perylene pigment is obtained through a condensation reaction of perylene-3,4,9,10-tetracarboxylic anhydride and an aromatic primary amine and has a hue from red to red-purple/brown. Specific examples of perylene pigments include perylene red, perylene orange, perylene maroon, perylene vermilion, and perylene bordeaux.

A condensed polyazo pigment is obtained through condensation of an azo pigment in a solvent to achieve a high molecular weight and has a hue of a yellow or red pigment. Specific examples of condensed polyazo pigments include polyazo red, polyazo yellow, chromophthal orange, chromophthal red, and chromophthal scarlet.

An isoindolinone pigment is obtained through a condensation reaction of 4,5,6,7-tetrachloroisoindolinone and an aromatic primary diamine and has a hue from greenish yellow to red/brown. A specific example of an isoindolinone pigment is isoindolinone yellow.

A copper phthalocyanine pigment is a pigment in which copper is coordinated with a phthalocyanine and has a hue from yellowish green to bright blue. Specific examples of copper phthalocyanine pigments include phthalocyanine green and phthalocyanine blue.

Titanium white is a white pigment made from titanium dioxide. Titanium white has high opacity and exists in anatase form and rutile form.

Carbon black is a black pigment having carbon as a main component and also including oxygen, hydrogen, and nitrogen. Specific examples of carbon black include thermal black, acetylene black, channel black, furnace black, lamp black, and bone black.

Specific examples of impact modifiers include an acrylonitrile-butadiene-styrene copolymer, a methyl methacrylate-butadiene-styrene copolymer, a chlorinated polyethylene, an ethylene-vinyl acetate copolymer, and a chlorosulfonated polyethylene. One impact modifier or two or more impact modifiers may be used in the presently disclosed vinyl chloride resin composition. Note that the impact modifier is dispersed as a heterogeneous phase of fine elastic particles in the vinyl chloride resin composition. In the vinyl chloride resin composition, polar groups and chains graft polymerized with the elastic particles are compatible with (a) the vinyl chloride resin and improve impact resistance of the vinyl chloride resin composition.

Specific examples of antioxidants include phenolic antioxidants, sulfuric antioxidants, and phosphoric antioxidants.

Specific examples of fungicides include aliphatic ester fungicides, hydrocarbon fungicides, organic nitrogen fungicides, and organic nitrogen sulfur fungicides.

Specific examples of flame retardants include halogen-containing flame retardants such as chlorinated paraffin, phosphoric flame retardants such as phosphate esters, and inorganic hydroxides such as magnesium hydroxide and aluminum hydroxide.

Specific examples of antistatic agents include: anionic antistatic agents such as fatty acid salts, higher alcohol sulfuric acid esters, and sulfonic acid salts; cationic antistatic agents such as aliphatic amine salts and quaternary ammonium salts; and non-ionic antistatic agents such as polyoxyethylene alkyl ethers and polyoxyethylene alkyl phenol ethers.

Specific examples of fillers include silica, talc, mica, calcium carbonate, and clay.

Specific examples of light stabilizers include ultraviolet absorbers based on benzotriazoles, benzophenone, and nickel chelate, and hindered amine light stabilizers.

Specific examples of foaming agents include: organic foaming agents such as azo compounds (for example, azodicarbonamides and azobisisobutyronitrile), nitroso compounds (for example, N,N'-dinitrosopentamethylenetetramine), and sulfonyl hydrazide compounds (for example, p-toluenesulfonyl hydrazide and p,p-oxybis(benzenesulfonyl hydrazide)); and gaseous foaming agents such as chlorofluorocarbons, carbon dioxide gas, water, and volatile hydrocarbons (for example, pentane), and microcapsules containing any of these gaseous foaming agents.

A β-diketone can be used to effectively suppress variation in initial color of a vinyl chloride resin molded product obtained through powder molding of the presently disclosed vinyl chloride resin composition. Specific examples of β-diketones include dibenzoylmethane, stearoylbenzoylmethane, and palmitoylbenzoylmethane. Any one of these β-diketones may be used alone or a combination of any two or more of these β-diketones may be used.

No specific limitations are placed on the amount of the β-diketone that is included. However, the amount of the β-diketone relative to 100 parts by mass of (a) the vinyl chloride resin is preferably at least 0.1 parts by mass and no greater than 5 parts by mass.

<Production Method of Vinyl Chloride Resin Composition>

The presently disclosed vinyl chloride resin composition can be produced by mixing the components described above.

No specific limitations are placed on the method used to mix (a) the vinyl chloride resin, (b) the dodecanedioic acid diester, and additionally (c) the trimellitic acid ester and other additives as required. One example of a preferable mixing method involves mixing all of the components with the exception of the plasticizer and the dusting agent (including (y) the vinyl chloride resin fine particles) by dry blending and subsequently mixing in the plasticizer and the dusting agent in order. The dry blending is preferably carried out using a Henschel mixer. The temperature during dry blending is preferably at least 50° C. and no greater than 100° C., and more preferably at least 70° C. and no greater than 80° C.

(Vinyl Chloride Resin Molded Product)

A presently disclosed vinyl chloride resin molded product is obtained through powder molding of the presently disclosed vinyl chloride resin composition described above and is preferably obtained through powder slush molding of the vinyl chloride resin composition. The mold temperature during powder slush molding is preferably at least 200° C. and no greater than 300° C., and more preferably at least 220° C. and no greater than 280° C.

In production of the presently disclosed vinyl chloride resin molded product, the presently disclosed vinyl chloride resin composition is for example sprinkled onto a mold having a temperature in the aforementioned range. The vinyl chloride resin composition is initially left for at least 5 seconds and no greater than 30 seconds and, after shaking off any excess vinyl chloride resin composition, is then further left for at least 30 seconds and no greater than 3 minutes. The mold is subsequently cooled to at least 10° C. and no greater than 60° C. and the presently disclosed vinyl chloride resin molded product obtained thereby is removed from the mold.

The presently disclosed vinyl chloride resin molded product is highly suitable for use as a surface skin of an automobile interior material such as an instrument panel or a door trim.

(Laminate)

A presently disclosed laminate is obtainable by stacking the presently disclosed vinyl chloride resin molded product with a foamed polyurethane molded product. Examples of stacking methods that can be adopted include: a method in which the vinyl chloride resin molded product and the foamed polyurethane molded product are prepared separately and are subsequently joined together by, for example, thermal fusion bonding, thermal adhesion, or using a commonly known adhesive; and a method in which raw materials of the foamed polyurethane molded product such as an isocyanate and a polyol are caused to react on the vinyl chloride resin molded product so as to polymerize while carrying out polyurethane foaming by a commonly known method to directly form the foamed polyurethane molded product on the vinyl chloride resin molded product. The latter of these methods is more suitable because it involves a simple process and enables laminates of various different shapes to be obtained while ensuring reliable adhesion of the vinyl chloride resin molded product and the foamed polyurethane molded product.

The presently disclosed laminate is highly suitable for use as an automobile interior material such as an instrument panel or a door trim.

EXAMPLES

The present disclosure is described in more detail through the following examples but is not limited to these examples.

Example 1 and Comparative Example 1

Ingredients shown in Table 1 with the exception of the plasticizers (bis(2-ethylhexyl) dodecanedioate, trimellitic acid ester, and epoxidized soybean oil) and vinyl chloride resin fine particles used as the dusting agent were added into a Henschel mixer and mixed. The plasticizers were added to the mixture after increasing the temperature of the mixture to 80° C. and the mixture was dried up (i.e., the aforementioned mixture changed to a dry state through absorption of the plasticizers by vinyl chloride resin particles used as the base vinyl chloride resin). Thereafter, once the dried-up mixture had been cooled to 70° C. or lower, the vinyl chloride resin fine particles used as the dusting agent were added to the mixture to produce a vinyl chloride resin composition.

The resultant vinyl chloride resin composition was sprinkled onto a textured mold that was heated to 250° C. and after being left to melt for a time adjusted to give a vinyl chloride resin molded sheet thickness of 1 mm (specifically, from 8 seconds to 18 seconds), excess vinyl chloride resin composition was shaken off. Next, the mold was placed in an oven set to 200° C. and once 60 seconds had passed, was cooled with cooling water. Once the mold had cooled to 40° C., a vinyl chloride resin molded sheet of 145 mm×175 mm×1 mm was removed from the mold. Various properties of the resultant vinyl chloride resin molded sheet were measured as described below. The results are shown in Table 1.

The measurement methods of the various properties were as follows.

(1) Initial Tensile Test

The vinyl chloride resin molded sheet was punched with a No. 1 dumbbell prescribed by JIS K6251, and tensile stress and tensile elongation thereof were measured in accordance with JIS K7113 at a tension rate of 200 mm/minute and at temperatures of 23° C. and −35° C. Note that a high tensile elongation at −35° C. indicates that a vinyl chloride resin molded sheet has superior flexibility at low temperatures.

(2) Viscoelasticity Test

An obtained vinyl chloride resin molded sheet was punched to dimensions of 10 mm×40 mm and a loss modulus peak top temperature was measured in accordance with JIS K7244-4 at a frequency of 10 Hz, a measurement temperature range of from −90° C. to +100° C., and a heating rate of 2° C./minute. Note that a low peak top temperature indicates that a vinyl chloride resin molded sheet has superior flexibility at low temperatures.

(3) Low-Temperature Embrittlement Test

An obtained vinyl chloride resin molded sheet was punched to dimensions of 6 mm×38 mm and an embrittlement temperature was obtained in accordance with JIS K7216 using test temperature intervals of 2° C. Note that a low embrittlement temperature indicates that a vinyl chloride resin molded sheet has superior flexibility at low temperatures.

TABLE 1

|  |  | Example 1 | Comparative Example 1 |
|---|---|---|---|
| Composition (parts by mass) | Base vinyl chloride resin[1] | 100.0 | 100.0 |
|  | Trimellitic acid ester[2] | — | 130.0 |
|  | Bis(2-ethylhexyl) dodecanedioate[3] | 130.0 | — |
|  | Epoxidized soybean oil[4] | 5.0 | 5.0 |
|  | Perchloric acid-treated hydrotalcite[5] | 5.0 | 5.0 |
|  | Zeolite[6] | 1.0 | 1.0 |
|  | Stearoylbenzoylmethane (β-diketone)[7] | 0.3 | 0.3 |
|  | Zinc stearate[8] | 0.2 | 0.2 |
|  | Vinyl chloride resin fine particles (dusting agent)[9] | 20.0 | 20.0 |
|  | Pigment[10] | 4.0 | 4.0 |
| Tensile stress (initial) @23° C. [MPa] |  | 8.1 | 9.1 |
| Tensile stress (initial) @ −35° C. [MPa] |  | 14.4 | 20.4 |
| Tensile elongation (initial) @23° C. [%] |  | 350 | 350 |
| Tensile elongation (initial) @ −35° C. [%] |  | 220 | 190 |
| Viscoelasticity test (peak top temperature) [° C.] |  | −77 | −47 |
| Embrittlement temperature [° C.] |  | ≤−70 | −47 |

[1]ZEST 2500Z (vinyl chloride resin particles, average degree of polymerization 2,500, average particle diameter 130 μm) produced by Shin Dai-ichi Vinyl Corporation
[2]TRIMEX N-08 produced by Kao Corporation
[3]Produced by Wako Pure Chemical Industries, Ltd.
[4]ADK CIZER O-130S produced by ADEKA Corporation
[5]ALCAMIZER 5 produced by Kyowa Chemical Industry Co., Ltd.
[6]MIZUKALIZER DS produced by Mizusawa Industrial Chemicals, Ltd.
[7]Karenz DL-1 produced by Showa Denko K.K.
[8]SAKAI SZ2000 produced by Sakai Chemical Industry Co., Ltd.
[9]ZEST PQLTX (vinyl chloride resin fine particles, average degree of polymerization 800, average particle diameter 2 μm) produced by Shin Dai-ichi Vinyl Corporation
[10]DA PX-1720 Black (A) produced by Dainichiseika Color and Chemicals Mfg. Co., Ltd.

A molded product (vinyl chloride resin molded sheet) obtained through powder slush molding of the vinyl chloride resin composition in Example 1 had a low loss modulus peak top temperature and a low embrittlement temperature, and thus had superior flexibility at low temperatures. The molded product also had superior initial tensile characteristics at both normal and low temperatures.

A molded product (vinyl chloride resin molded sheet) obtained through powder slush molding of the vinyl chloride resin composition in Comparative Example 1, which did not include a dodecanedioic acid diester, had a high loss modulus peak top temperature and a high embrittlement temperature, and thus had poor flexibility at low temperatures.

Examples 2-6 and Comparative Examples 1 and 2

Ingredients shown in Table 2 with the exception of the plasticizers (trimellitic acid ester, bis(2-ethylhexyl) dodecanedioate, bis(2-ethylhexyl) sebacate, and epoxidized soybean oil) and vinyl chloride resin fine particles used as the dusting agent were added into a Henschel mixer and mixed. The plasticizers were added to the mixture after increasing the temperature of the mixture to 80° C. and the mixture was dried up (i.e., the aforementioned mixture changed to a dry state through absorption of the plasticizers by vinyl chloride resin particles used as the base vinyl chloride resin). Thereafter, once the dried-up mixture had been cooled to 70° C. or lower, the vinyl chloride resin fine particles used as the dusting agent were added to the mixture to produce a vinyl chloride resin composition.

The resultant vinyl chloride resin composition was sprinkled onto a textured mold that was heated to 250° C. and after being left to melt for a time adjusted to give a vinyl chloride resin molded sheet thickness of 1 mm (specifically, from 8 seconds to 18 seconds), excess vinyl chloride resin composition was shaken off. Next, the mold was placed in an oven set to 200° C. and was cooled with cooling water once 60 seconds had passed. Once the mold had cooled to 40° C., a vinyl chloride resin molded sheet of 145 mm×175 mm×1 mm was removed from the mold. Various properties of the resultant vinyl chloride resin molded sheet were measured as described below. The results are shown in Table 2.

The measurement methods of the various properties were as follows.

(4) Initial Tensile Test

The vinyl chloride resin molded sheet was punched with a No. 1 dumbbell prescribed by JIS K6251, and tensile stress and tensile elongation thereof were measured in accordance with JIS K7113 at a tension rate of 200 mm/minute and at temperatures of 23° C. and −35° C. Note that a high tensile elongation at −35° C. indicates that a vinyl chloride resin molded sheet has superior flexibility at low temperatures.

(5) Post-Heating Tensile Test

A measurement sample was prepared as follows. Two obtained vinyl chloride resin molded sheets were placed in a mold having dimensions of 200 mm×300 mm×10 mm with a textured surface below the molded sheets such that the molded sheets did not overlap one another. A mixed solution was prepared by mixing polymethylene polyphenylene polyisocyanate (polymeric MDI) with a polyol mixture in a ratio determined to give an isocyanate index of 98. The polyol mixture was composed of 50 parts by mass of a propylene glycol PO (propylene oxide)/EO (ethylene oxide) block adduct (hydroxyl value 28, terminal EO unit content 10%, internal EO unit content 4%), 50 parts by mass of a glycerin PO/EO block adduct (hydroxyl value 21, terminal EO unit content 14%), 2.5 parts by mass of water, 0.2 parts by mass of an ethylene glycol solution of triethylenediamine (product name: TEDA-L33, produced by Tosoh Corporation), 1.2 parts by mass of triethanolamine, 0.5 parts by mass of triethylamine, and 0.5 parts by mass of a foam stabilizer (product name: F-122, produced by Shin-Etsu Chemical Co., Ltd.). Thereafter, the resultant mixed solution was poured onto the two vinyl chloride resin molded sheets and the mold was covered with an aluminum plate of 348 mm×255 mm×10 mm to seal the mold. After 5 minutes, a sample (laminate) was formed, in the mold, of a surface skin formed by a vinyl chloride resin molded sheet having a thickness of 1 mm lined with a foamed polyurethane molded product having a thickness of 9 mm and a density of 0.18 g/cm³. The resultant sample was removed from the mold.

Thereafter, the resultant sample was placed in an oven and after the sample was heated for 250 hours at 130° C., the foamed polyurethane layer was peeled from the sample. Tensile stress and tensile elongation of the sample were measured at temperatures of 23° C. and −35° C. in the same way as in the initial tensile test described above in section (4). Note that a high tensile elongation at −35° C. indicates that a vinyl chloride resin molded sheet has superior flexibility at low temperatures.

(6) Viscoelasticity Test

An obtained vinyl chloride resin molded sheet was punched to dimensions of 10 mm×40 mm and a loss modulus peak top temperature was measured in accordance with JIS K7244-4 at a frequency of 10 Hz, a measurement temperature range of from −90° C. to +100° C., and a heating rate of 2° C./minute. Note that a low peak top temperature indicates that a vinyl chloride resin molded sheet has superior flexibility at low temperatures.

(7) Low-Temperature Embrittlement Test

An obtained vinyl chloride resin molded sheet was punched to dimensions of 6 mm×38 mm and an embrittlement temperature was obtained in accordance with JIS K7216 using test temperature intervals of 2° C. Note that a low embrittlement temperature indicates that a vinyl chloride resin molded sheet has superior flexibility at low temperatures.

(8) Fogging Test

An obtained vinyl chloride resin molded sheet was punched into a circle having a diameter of 80 mm and, using a device in accordance with the standard ISO6452, the vinyl chloride resin molded sheet was placed in a test bottle heated to 100° C., a glass plate cooled to 20° C. was set over an opening of the test bottle, and a fogging test was carried out for 3 hours. After the test, the glass plate was left to stand for 1 hour at a temperature of 23° C. and a humidity of 50% and then 60° reflectance thereof was measured using a glossiness test device (GP-60 produced by Tokyo Denshoku Co., Ltd.). The 60° reflectance of the glass plate was also measured before the test and glossiness retention (%) of the glass plate was calculated using the following equation. Note that high glossiness retention indicates that a vinyl chloride resin molded sheet has superior fogging characteristics.

Glossiness retention (%)=100×[(Post-test glass plate glossiness)/(Pre-test glass plate glossiness)]

Molded products (vinyl chloride resin molded sheets) obtained through powder slush molding of the vinyl chloride resin compositions in Examples 2-6 had low loss modulus peak top temperatures and low embrittlement temperatures, and thus had superior flexibility at low temperatures. These molded products also had superior initial and post-heating tensile characteristics at both normal and low temperatures.

A molded product (vinyl chloride resin molded sheet) obtained through powder slush molding of the vinyl chloride resin composition in Comparative Example 1, which did not include a dodecanedioic acid diester, had poorer initial tensile characteristics at low temperatures than the molded products obtained through powder slush molding of the vinyl chloride resin compositions in Examples 2-6. Furthermore, the molded product obtained through powder slush molding of the vinyl chloride resin composition in Comparative Example 1 had a high loss modulus peak top temperature and a high embrittlement temperature, and thus had poor flexibility at low temperatures. Moreover, a molded product (vinyl chloride resin molded sheet) obtained through powder slush molding of the vinyl chloride resin composition in Comparative Example 2, which included bis(2-ethylhexyl) sebacate but did not include a dodecanedioic acid diester, had poorer post-heating tensile characteristics at low temperatures than the molded products obtained through powder slush molding of the vinyl chloride resin compositions in Examples 2-6.

INDUSTRIAL APPLICABILITY

The presently disclosed vinyl chloride resin composition is highly suitable as, for example, a molding material for a

TABLE 2

| | | Example 2 | Example 3 | Example 4 | Example 5 | Example 6 | Comparative Example 1 | Comparative Example 2 |
|---|---|---|---|---|---|---|---|---|
| Composition (parts by mass) | Base vinyl chloride resin[1] | 100.0 | 100.0 | 100.0 | 100.0 | 100.0 | 100.0 | 100.0 |
| | Trimellitic acid ester[2] | 125.0 | 120.0 | 110.0 | 90.0 | 70.0 | 130.0 | 90.0 |
| | Bis(2-ethylhexyl) dodecanedioate[3] | 5.0 | 10.0 | 20.0 | 40.0 | 60.0 | — | — |
| | Bis(2-ethylhexyl) sebacate[11] | — | — | — | — | — | — | 40.0 |
| | Epoxidized soybean oil[4] | 5.0 | 5.0 | 5.0 | 5.0 | 5.0 | 5.0 | 5.0 |
| | Perchloric acid-treated hydrotalcite[5] | 5.0 | 5.0 | 5.0 | 5.0 | 5.0 | 5.0 | 5.0 |
| | Zeolite[6] | 1.0 | 1.0 | 1.0 | 1.0 | 1.0 | 1.0 | 1.0 |
| | Stearoylbenzoylmethane (β-diketone)[7] | 0.3 | 0.3 | 0.3 | 0.3 | 0.3 | 0.3 | 0.3 |
| | Zinc stearate[8] | 0.2 | 0.2 | 0.2 | 0.2 | 0.2 | 0.2 | 0.2 |
| | Vinyl chloride resin fine particles (dusting agent)[9] | 20.0 | 20.0 | 20.0 | 20.0 | 20.0 | 20.0 | 20.0 |
| | Pigment[10] | 4.0 | 4.0 | 4.0 | 4.0 | 4.0 | 4.0 | 4.0 |
| Tensile stress (initial) @23° C. [MPa] | | 9.4 | 8.7 | 8.5 | 8.6 | 8.7 | 9.1 | 8.4 |
| Tensile stress (initial) @ −35° C. [MPa] | | 20.5 | 20.5 | 19.4 | 18.3 | 17.5 | 20.4 | 18.7 |
| Tensile elongation (initial) @23° C. [%] | | 370 | 350 | 350 | 360 | 380 | 350 | 360 |
| Tensile elongation (initial) @ −35° C. [%] | | 200 | 220 | 210 | 220 | 230 | 190 | 230 |
| Tensile stress (after 250 hours heating) @23° C. [MPa] | | 13.5 | 14.3 | 14.1 | 15.2 | 15.7 | 13.6 | 17.1 |
| Tensile stress (after 250 hours heating) @ −35° C. [MPa] | | 20.5 | 20.5 | 19.4 | 18.3 | 27.8 | 27.0 | 31.0 |
| Tensile elongation (after 250 hours heating) @23° C. [%] | | 320 | 330 | 310 | 320 | 300 | 310 | 310 |
| Tensile elongation (after 250 hours heating) @ −35° C. [%] | | 140 | 130 | 120 | 130 | 130 | 140 | 90 |
| Viscoelasticity test (peak top temperature) [° C.] | | −49 | −49 | −53 | −59 | −63 | −47 | −59 |
| Embrittlement temperature [° C.] | | −49 | −51 | −54 | −58 | −62 | −47 | −57 |
| Fogging characteristics (glossiness retention) [%] | | 98 | 97 | 93 | 86 | 82 | 99 | 76 |

[1]ZEST 2500Z (vinyl chloride resin particles, average degree of polymerization 2,500, average particle diameter 130 μm) produced by Shin Dai-ichi Vinyl Corporation
[2]TRIMEX N-08 produced by Kao Corporation
[3]Produced by Wako Pure Chemical Industries, Ltd.
[4]ADK CIZER O-130S produced by ADEKA Corporation
[5]ALCAMIZER 5 produced by Kyowa Chemical Industry Co., Ltd.
[6]MIZUKALIZER DS produced by Mizusawa Industrial Chemicals, Ltd.
[7]Karenz DL-1 produced by Showa Denko K.K.
[8]SAKAI SZ2000 produced by Sakai Chemical Industry Co., Ltd.
[9]ZEST PQLTX (vinyl chloride resin fine particles, average degree of polymerization 800, average particle diameter 2 μm) produced by Shin Dai-ichi Vinyl Corporation
[10]DA PX-1720 Black (A) produced by Dainichiseika Color and Chemicals Mfg. Co., Ltd.
[11]Produced by Wako Pure Chemical Industries, Ltd.

surface skin of an automobile interior material such as an instrument panel or a door trim.

The invention claimed is:

1. A vinyl chloride resin composition comprising:
(a) a vinyl chloride resin,
(b) a dodecanedioic acid diester; and
(C) a trimellitic acid ester, wherein
a total amount of (b) the dodecanedioic acid diester and (c) the trimellitic acid ester relative to 100 parts by mass of (a) the vinyl chloride resin is from 5 parts by mass to 200 parts by mass,
a blending ratio of (b) the dodecanedioic acid diester relative to (c) the trimellitic acid ester, expressed as a mass ratio, is from 50/50 to 99/1,
(a) the vinyl chloride resin includes (x) a base vinyl chloride resin in an amount of from 70 mass % to 100 mass % and (y) vinyl chloride resin fine particles having an average particle diameter of at least 0.1 pm and no greater than 10 pm in an amount of from 0 mass % to 30 mass %, and
wherein the vinyl chloride resin composition is free of a sebacate.

2. The vinyl chloride resin composition of claim 1, wherein
(x) the base vinyl chloride resin is vinyl chloride resin particles having an average particle diameter of at least 50 μm and no greater than 500 μm.

3. The vinyl chloride resin composition of claim 2 used in powder molding.

4. The vinyl chloride resin composition of claim 2 used in powder slush molding.

5. A vinyl chloride resin molded product obtainable through powder molding of the vinyl chloride resin composition of claim 2.

6. The vinyl chloride resin molded product of claim 5 used as a surface skin of an automobile instrument panel.

7. A laminate comprising:
a foamed polyurethane molded product; and
the vinyl chloride resin molded product of claim 5.

* * * * *